United States Patent
Bethmangalkar et al.

(10) Patent No.: US 7,107,355 B2
(45) Date of Patent: Sep. 12, 2006

(54) HIGH AVAILABILITY LIGHTWEIGHT DIRECTORY ACCESS PROTOCOL SERVICE

(75) Inventors: Ramachandra Bethmangalkar, Santa Clara, CA (US); Frederic E. Herrmann, Palo Alto, CA (US); Louay Gammo, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 702 days.

(21) Appl. No.: 10/074,763

(22) Filed: Feb. 11, 2002

(65) Prior Publication Data

US 2003/0154305 A1  Aug. 14, 2003

(51) Int. Cl.
  *G06F 15/16* (2006.01)
  *G06F 11/00* (2006.01)
  *G06F 17/30* (2006.01)
(52) U.S. Cl. .................. 709/245; 714/100; 707/204
(58) Field of Classification Search ............... 709/203, 709/245; 707/203, 204; 714/100
See application file for complete search history.

(56) References Cited

U.S. PATENT DOCUMENTS

| | | | | |
|---|---|---|---|---|
| 5,513,314 A * | 4/1996 | Kandasamy et al. | ........... | 714/6 |
| 5,999,931 A * | 12/1999 | Breitbart et al. | .............. | 707/10 |
| 6,182,142 B1 * | 1/2001 | Win et al. | .................... | 709/229 |
| 6,209,032 B1 * | 3/2001 | Dutcher et al. | ............. | 709/223 |
| 6,247,017 B1 * | 6/2001 | Martin | ........................ | 707/102 |
| 6,247,141 B1 * | 6/2001 | Holmberg | ...................... | 714/2 |
| 6,292,905 B1 * | 9/2001 | Wallach et al. | ................ | 714/4 |
| 6,301,589 B1 * | 10/2001 | Hirashima et al. | .......... | 707/204 |
| 6,442,706 B1 * | 8/2002 | Wahl et al. | ..................... | 714/6 |
| 6,539,381 B1 * | 3/2003 | Prasad et al. | ................. | 707/10 |
| 6,615,223 B1 * | 9/2003 | Shih et al. | .................. | 707/201 |
| 6,928,577 B1 * | 8/2005 | Moser et al. | .................. | 714/4 |
| 2002/0162020 A1 * | 10/2002 | Bellaton et al. | ............ | 713/201 |
| 2002/0174103 A1 * | 11/2002 | Hsiao et al. | .................... | 707/1 |
| 2003/0014480 A1 * | 1/2003 | Pullara et al. | .............. | 709/203 |
| 2003/0088654 A1 * | 5/2003 | Good et al. | .................. | 709/223 |

OTHER PUBLICATIONS

W. Yeong, Mar. 1995, Performance Systems International, RFC 1777—Lightweight Directory Access Protocol, 1-18.*
Rick Cook, Oct. 2, 2001, Storage Tips:, Journaling vs. scoreboarding.*
University of Michigan, Introduction to slapd and slrpd, [online], Apr. 30, 1996, release 3.3, [retrieved on Dec. 5, 2001], 4 pages. Retrieved from the internet: <http://www.umich.edu/~dirsvcs/ldap/doc/guides/slapd/1.html>.
Gracion Software, What is LDAP? [online] 2 pages. [Retrieved on Dec. 4, 2001]. Retrieved form the internet: <http://www.gracion.com/server/whatldap.html>.
iPlanet /Sun Microsystems, iDAR FAQs, Features, and Troubleshooting [online], Jul. 26, 2001, 6 pages. [Retrieved on Dec. 4, 2001]. Retrieved from the internet: <http://docs.iplanet.com/docs/manuals/dar/50/faq/faq.html>.

* cited by examiner

*Primary Examiner*—Jason Cardone
*Assistant Examiner*—Chirag R Patel
(74) *Attorney, Agent, or Firm*—Hickman Palermo Truong & Becker LLP; Christopher J. Brokaw (57) ABSTRACT

Management of lightweight directory access protocol (LDAP) service may be accomplished through the use of remote mirroring and a unique application program interface (API). Both a primary and a secondary LDAP server are maintained. Any modification to the primary LDAP server is then mirrored on the secondary LDAP server. When a call is attempted on the primary server, if it fails, the call is retried on the secondary LDAP server. The API allows for specialized grammar for commands that permits the system to handle primary (and secondary) LDAP server failure.

15 Claims, 10 Drawing Sheets

HIGH AVAILABILITY LIGHTWEIGHT DIRECTORY ACCESS PROTOCOL SERVICE

FIELD OF THE INVENTION

The present invention relates to the field of computer science. More particularly, the present invention relates to an end-to-end high availability Lightweight Directory Access Protocol (LDAP) service.

BACKGROUND OF THE INVENTION

Directory services for computer networks have been around for several years. When the Internet became popular, it was necessary to create a way to locate organizations, individuals, and other resources such as files and devices in a network, whether on the Internet or a corporate network. This information may need to be retrieved even without knowing a domain name, Internet Protocol (IP) address, or geographic location.

In order to satisfy this need, the major computer software companies agreed to the Lightweight Directory Access Protocol (LDAP) standard. LDAP is a client-server protocol, wherein an LDAP directory can be distributed among many servers on a network, then replicated and synchronized regularly. LDAP aware client programs may ask LDAP severs to look up entries in a variety of ways. LDAP servers index all the data in their entries and filters may be used to select just the person or group needed.

An entry is a collection of attributes that has a name, called a distinguished name (DN). The DN may then be used to unambiguously refer to the entry. Each of the entry's attributes has a type and one or more values. The types are typically abbreviated strings, like "cn" for common name, or "mail" for email address. The values depend on the type of the corresponding attributes. For example, a mail attribute may contain "person@company.com", whereas a jpegphoto attribute may contain a photograph in binary JPEG format. Permissions may be set to allow only certain people to access the LDAP database, or to keep certain data private.

In a typical LDAP network, there is a node (computer) designated as the master. The LDAP server may run on this master node, in which case it is called the primary LDAP server. There are then many clients dispersed on many different nodes interacting with the LDAP server on the master node through an LDAP Application Program Interface (API). There is also typically another special node called the vice-master node, which acts as a backup for the master node in case of failure. The LDAP server on the vice-master node is called the secondary LDAP server.

When the LDAP server on the master node fails (or the master node itself fails and brings the LDAP server down along with it), the vice-master is promoted to be the new master node. The secondary LDAP server is then promoted to be the primary LDAP server in the network.

The data managed by the different instances of LDAP servers (primary and secondary) must be consistent. Though different LDAP server instances may be acting as the primary LDAP server, a modification performed by the primary LDAP server must be immediately available to the secondary LDAP server, in case the primary LDAP server fails just after the modification takes place.

The typical solution to this problem is to configure the primary and secondary LDAP serves to use a master-master replication if one is available. However, the replication in this case is not strong, in that the updates on one LDAP server are not guaranteed to be available immediately on the other LDAP server.

What is needed is a solution which guarantees that the updates on the primary LDAP server are immediately available on the secondary LDAP server. Additionally, what is needed is a solution which is completely transparent to clients, meaning any failure of a primary LDAP server and subsequent transfer to a secondary LDAP server must undetectable to a client.

BRIEF DESCRIPTION OF THE INVENTION

Management of lightweight directory access protocol (LDAP) service may be accomplished through the use of remote mirroring and a unique application program interface (API). Both a primary and a secondary LDAP server are maintained. Any modification to the primary LDAP server is then mirrored on the secondary LDAP server. When a call is attempted on the primary server, if it fails, the call is retried on the secondary LDAP server. The API allows for specialized grammar for commands that permits the system to handle primary (and secondary) LDAP server failure.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
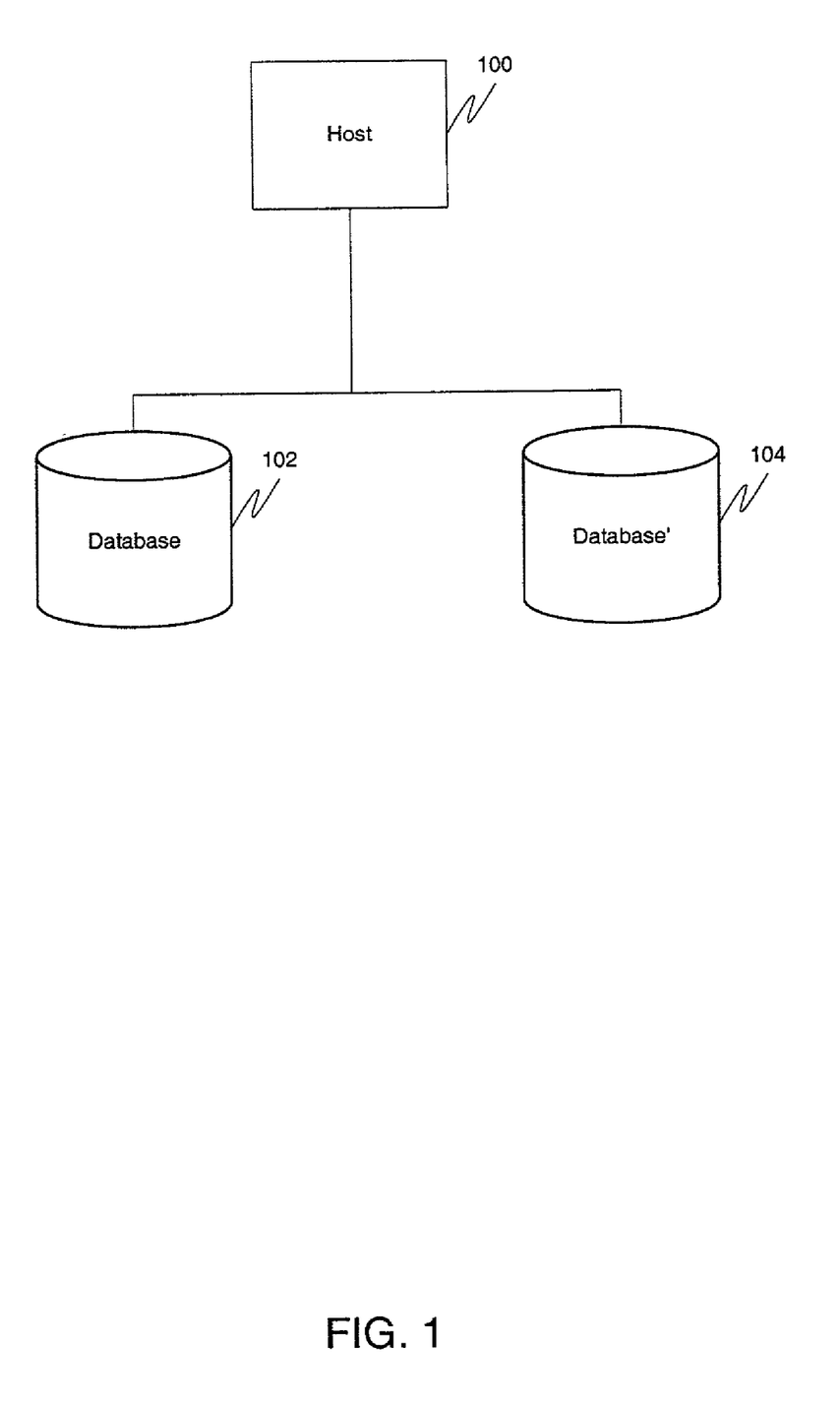
FIG. 1 is a block diagram illustrating local mirroring.
Figure 2:
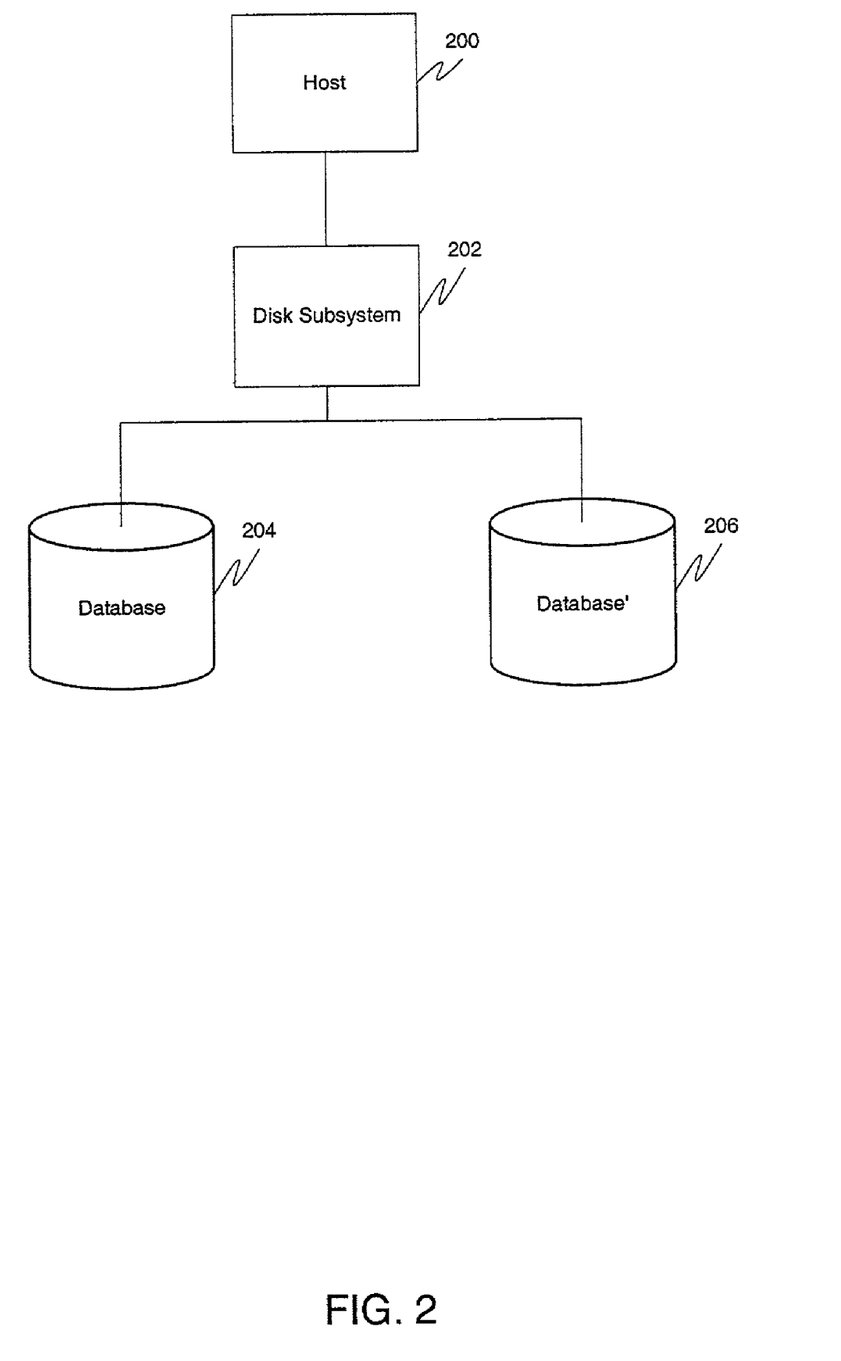
FIG. 2 is a block diagram illustrating local mirroring using a disk subsystem.

In a specific embodiment of the present invention, guaranteed immediate LDAP server data replication is accomplished using remotely mirrored disks. As its name suggests, mirroring involves the immediate backup of data to another location. Local mirroring has been available for many years. In local mirroring, an operating system issues duplicate write commands to separate volumes. This is also known as a dual copy. FIG. 1 is a block diagram illustrating local mirroring. In some systems, a disk subsystem is utilized to handle the actual copy command, which allows replication to be completed more quickly while offloading the host's processors and buses. Host 100 issues duplicate writes to separate volumes 102, 104. FIG. 2 is a block diagram illustrating local mirroring using a disk subsystem. Host 200 issues a write command to a disk subsystem 202, which issues duplicate writes to separate volumes 204, 206.

At first glance, remote mirroring may seem to be just an extension of local mirroring over a geographic distance. However, there are several problems inherent in local mirroring that makes it inadequate for communication with a distant location. First, high performance input/output channels have short-distance signaling characteristics. For example, the SCSI standard is limited to 25-meter cable runs. Although SCSI extenders are available, they are mechanically cumbersome and expensive, especially as the number of remote connections increases. Other standards have been introduced which can improve upon these limitations, but at this time it is currently not possible to extend the connection more than 100 km. While this may seem like a large distance, this does not provide the desired protection against regional disasters such as earthquakes and hurricanes. A second problem with extending local mirroring is that there may be a lack of a right-of-way for the interconnecting cable. While fiberoptic cable exists under many cities, very little of it is obtainable for private use as most of it is occupied with telecommunications traffic and switches. Lastly, there is a round-trip delay when extending local mirroring. The delay is proportional to distance, and is exacerbated by the use of extenders and communications protocol overhead. This results in progressively slower application response times, as the host must wait for the mirror to be updated before proceeding.

Figure 3:
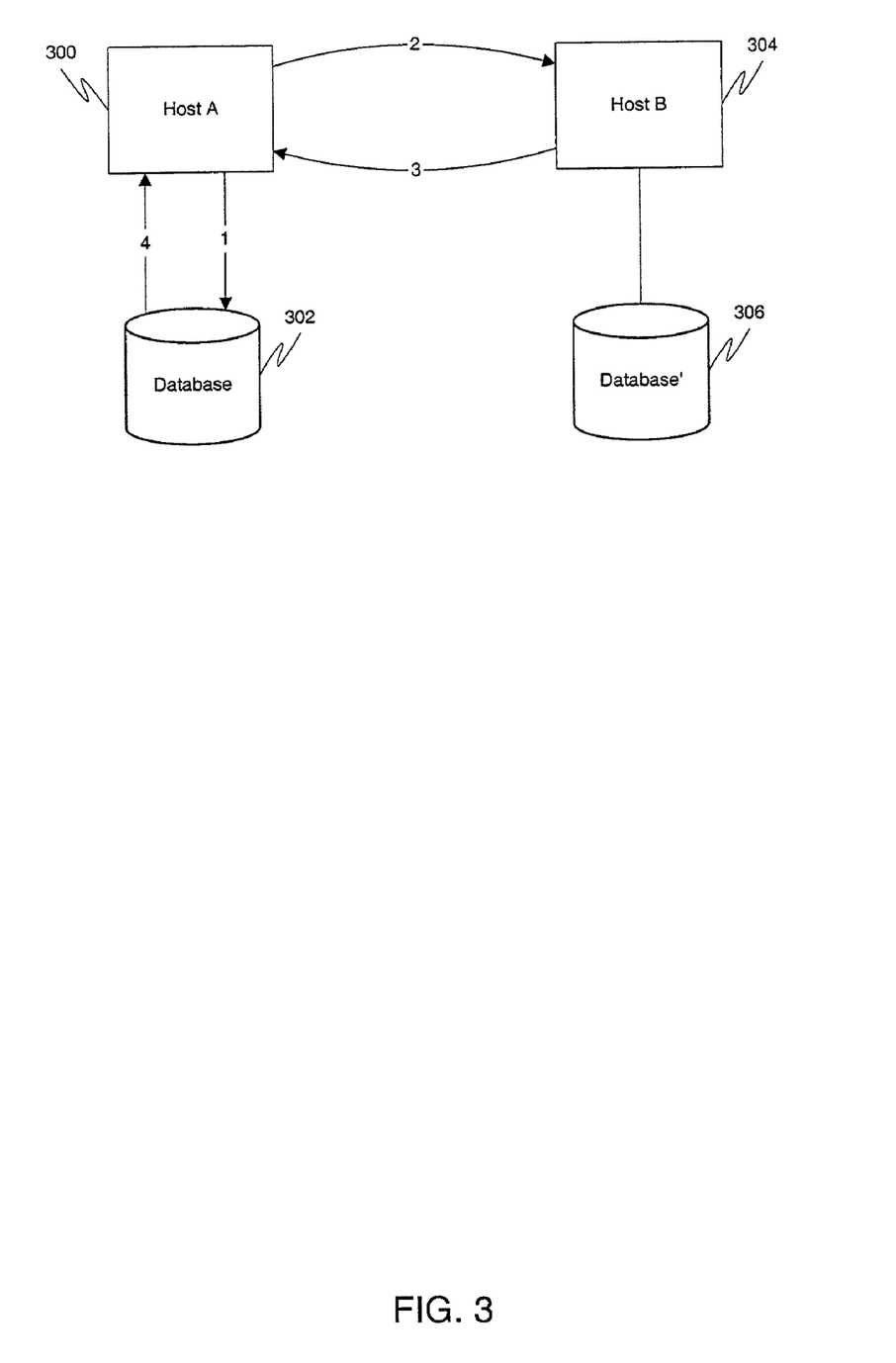
FIG. 3 is a block diagram illustrating synchronous remote mirroring in accordance with a specific embodiment of the present invention.

Thus, remote mirroring is preferred over local mirroring for many applications. In remote mirroring two (or more) hosts are utilized for the same write operation. The mirroring may either be synchronous or asynchronous. In synchronous mirroring, the host writes to the remote site as part of the I/O command processing. FIG. 3 is a block diagram-illustrating synchronous remote mirroring in accordance with a specific embodiment of the present invention. Host A 300 issues a write to database 302. Then it issues a request to write to host B 304, which issues a write to database' 306. However, database 302 waits for confirmation of the remote write before signaling I/O completion to host A 300.

Figure 4:
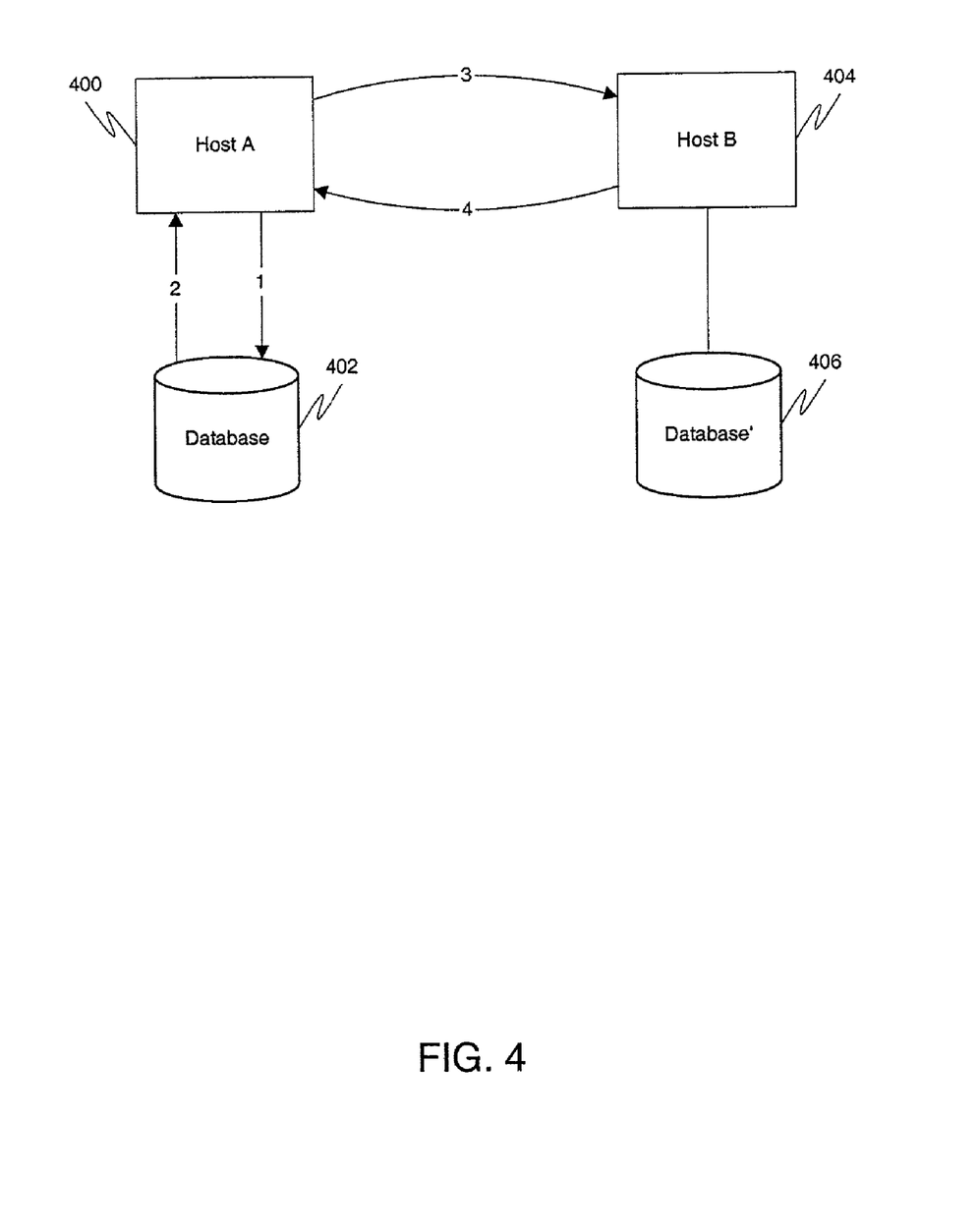
FIG. 4 is a block diagram illustrating asynchronous remote mirroring in accordance with a specific embodiment of the present invention.

FIG. 4 is a block diagram illustrating asynchronous remote mirroring in accordance with a specific embodiment of the present invention. Host A 400 issues a write to database 402, which then confirms the write to host A 400. Then host A issues a request to write to host B 404, which issues a write to database' 406, which then sends confirmation back to host A.

In a specific embodiment of the present invention, logging is utilized to improve disaster recovery. When an outage happens in the primary LDAP server, the secondary LDAP server will continue to update during the outages. When the primary LDAP server is back online, the images are no longer synchronized. The process of reestablishing mirrored images is called resynchronization. Logging may be utilized to reduce resynchronization time. Changes occurring during the interruption are logged. Journals and scoreboards (bivectors) are two possible ways to accomplish this. Journaled designs capture every new write in a running log, whereas scoreboards keep track of changed locations.

In accordance with a specific embodiment of the present invention, several types of resynchronization are possible: fall synchronization, journaled resynchronization, and update resynchronization from scoreboards. In full synchronization, a complete disk-to-disk copy is made. This is most useful when the target volume is in an unknown state, such as when it is possible that the volume has been completely erased. In journaled synchronization, the accumulated writes are played back against the stale image. In update resynchronization from scoreboards, the scoreboards keep pointer to disk locations that have been modified during the outage. Scoreboards tend to be much smaller than journals, and thus are advantageous when disk size is a concern, but resynchronization can take longer than in journaled synchronization.

Figure 5:
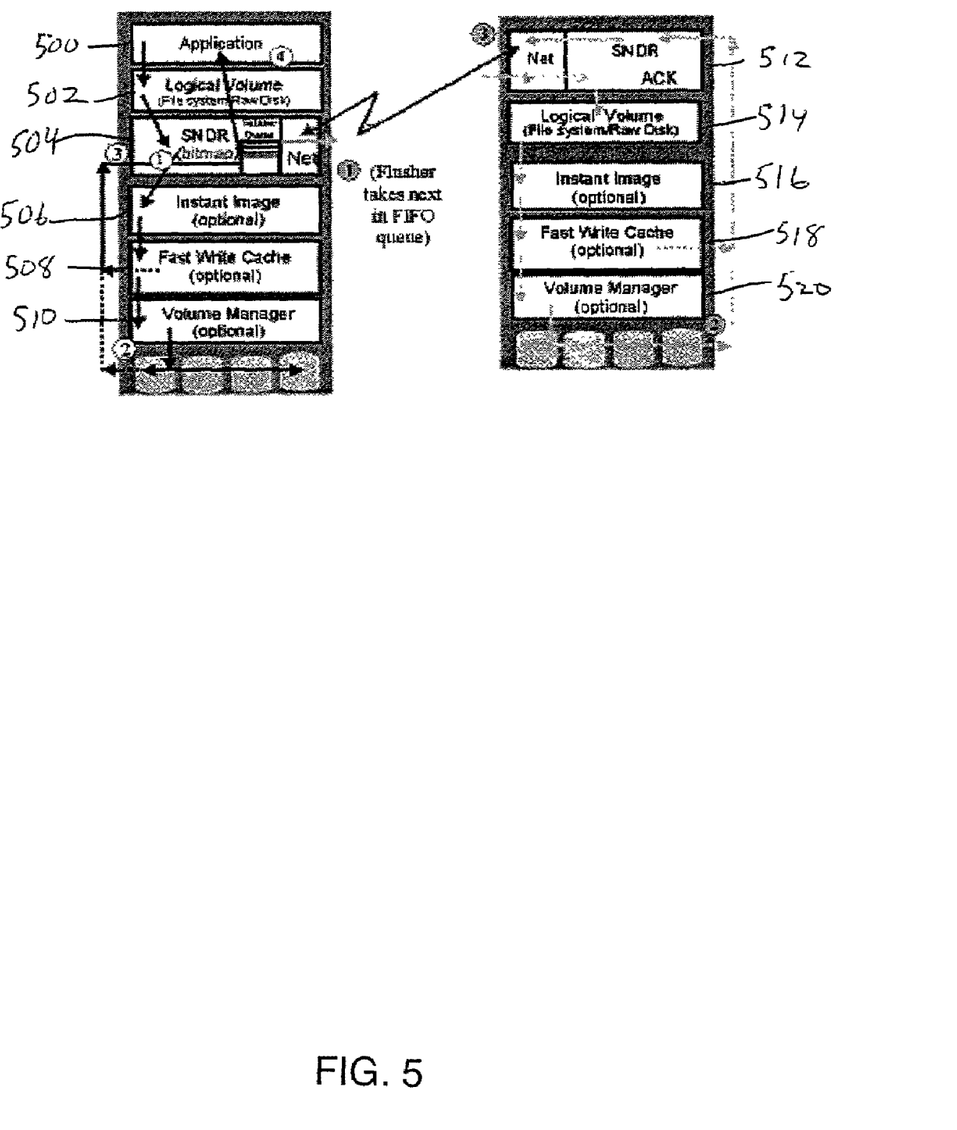
FIG. 5 is a block diagram illustrating remote mirroring in accordance with a specific embodiment of the present invention.

FIG. 5 is a block diagram illustrating remote mirroring in accordance with a specific embodiment of the present invention. This diagram provides more detail than FIG. 2 and FIG. 3. Mirroring software on the primary LDAP server may include an application 500, a logical volume 502, a bitmap 504, as well as an instant image 506, a fast write cache 508, and a volume manager 510. The secondary LDAP server may include a bitmap 512, a logical volume 514, an instant image 516, a fast write cache 518, and a volume manager 520.

Figure 6:
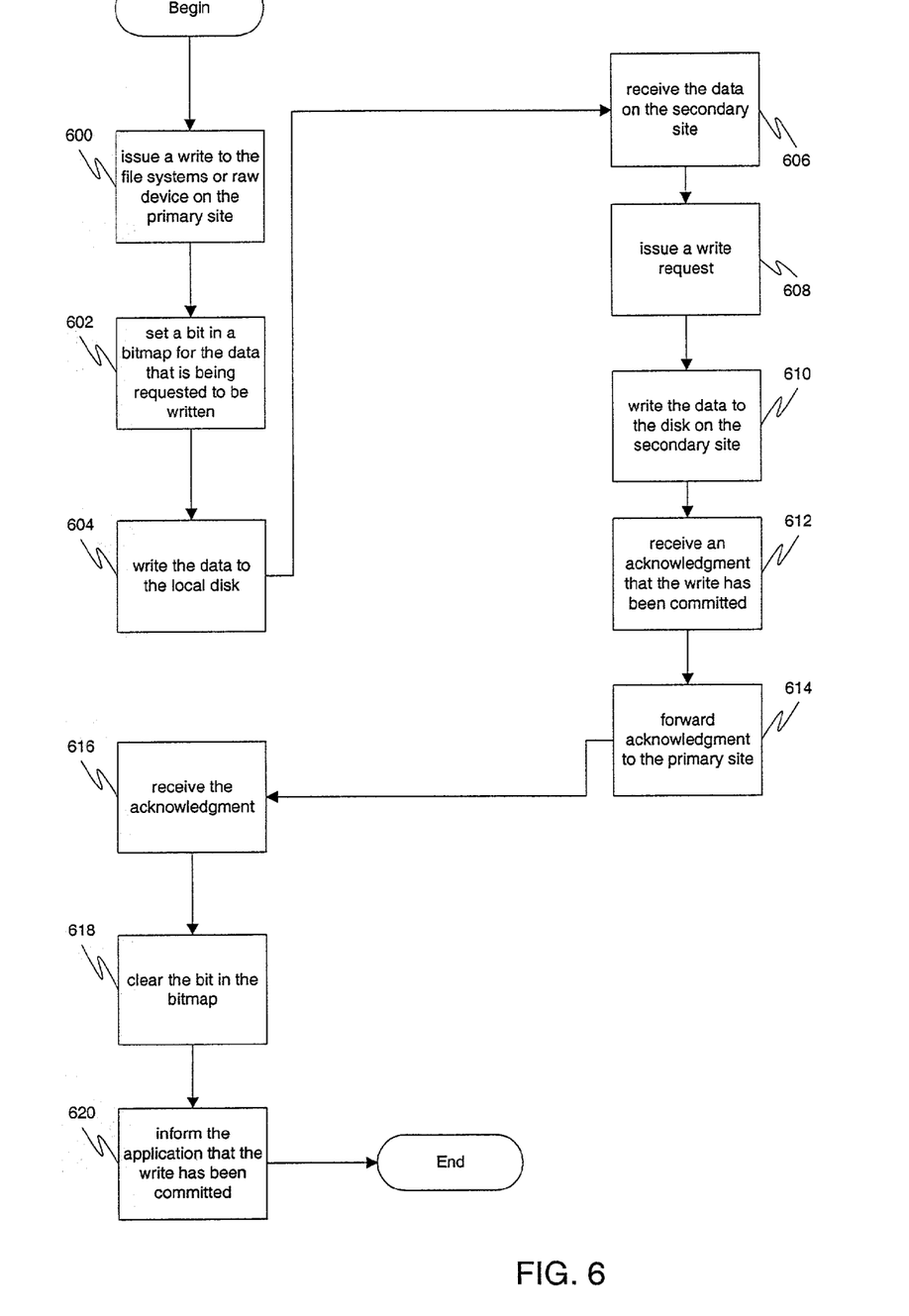
FIG. 6 is a flow diagram illustrating a method for synchronous remote mirroring in accordance with a specific embodiment of the present invention.

FIG. 6 is a flow diagram illustrating a method for synchronous remote mirroring in accordance with a specific embodiment of the present invention. At 600, the application issues a write to the file systems or raw device on the primary site. At 602, this write goes into the mirroring software later where a bit is set in the bitmap for the data that is being requested to be written. At 604, the data is written to the local disk. At 606, the data is received by the mirroring software on the secondary site. At 608, a write request is issued by the mirroring software on the secondary site. At 610, the data is written to the disk on the secondary site. At 612, once the write is committed to the disk on the secondary site, the mirroring software on the secondary site receives an acknowledgment. At 614, the mirrroring software on the secondary site sends this acknowledgment to the mirrroring software on the primary site. At 616, the mirroring software on the primary site receives the acknowledgment. At 618, the mirroring software on the primary site clears the bit in the bitmap. At 620, the mirroring software on the primary site informs the application that the write has been committed.

Figure 7:
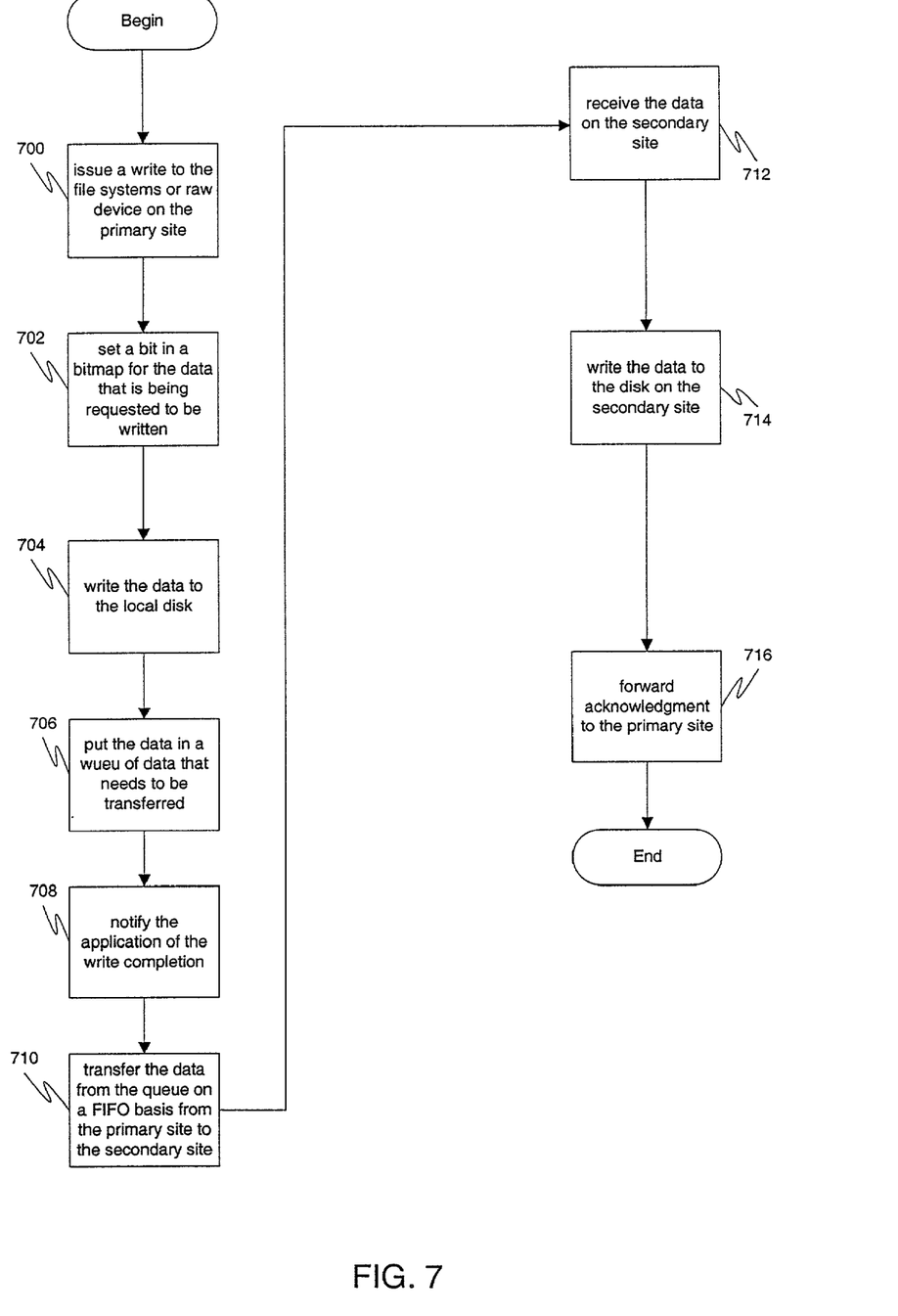
FIG. 7 is a flow diagram illustrating a method for asynchronous remote mirroring in accordance with a specific embodiment of the present invention.

In a specific embodiment of the present invention, the remote mirroring traffic is sent using the Internet Protocol (IP). FIG. 7 is a flow diagram illustrating a method for asynchronous remote mirroring in accordance with a specific embodiment of the present invention. At 700, the application issues a write to the file systems or raw device on the primary site. At 702, the write goes to the mirroring software layer on the primary site where a bit is set in the bitmap for the data being requested to be written. At 704, the data is written to the local disk. At 706, the mirroring software on the primary site puts the data in a queue of data that needs to be transferred. At 708, application on the primary site is notified of the write completion. At 710, data from the queue is transferred on a FIFO basis from the primary site to the secondary site. At 712, the mirroring software on the secondary site receives the data. At 714, the data is written to the disk on the secondary site. At 716, once the write has been committed to the secondary site, the mirroring software on the secondary site sends an acknowledgment to the mirroring software on the primary site.

In a specific embodiment of the present invention, transparency to the user may be accomplished using a specialized application program interface (API). When a master node fails or otherwise is switched, the API will attempt to reconnect to the LDAP server on the new master node until it succeeds or an implementation defined timeout occurs. If it fails to recover after the timeout is generated, an error may be propagated to the application. The application may then decide how to handle the error. Additionally, the API will automatically retry the call that failed when the LDAP server was down.

In a specific embodiment of the present embodiment, an application may use the API by first initializing an LDAP session with the LDAP server. A handle is then assigned to the session. LDAP operations may then be performed and results obtained. When the operations are completed the session may be closed.

Operations may be performed synchronously. Asynchronous calls may be performed by using a native LDAP handle rather than a handle as defined in the present invention. All routines return an indication of the outcome of the operation. However, if a request cannot be serviced because of LDAP server failure, no server down error is returned. Instead, the operation is retried with the LDAP server on the new master node. Only if the request still cannot be serviced on the new master node will a server down error be returned to the application.

Since the LDAP protocol is a client-server model, certain LDAP operations are non-idempotent. A non-idempotent operation is one that cannot be performed multiple times without producing a semantically different result than when performed once. In LDAP, the add, delete, and rename operations are non-idempotent, and thus present unique challenges in several scenarios. Several scenarios should be examined:

1. The LDAP server crashes before receiving a request. There is no problem with this situation because the data is still consistent between the master and the vice-master. The client library will try to contact the server and get an error.
2. The LDAP server crashes after accepting a request but before processing it. In this case the client library would timeout and try again. Since the data is not yet modified, the client perspective when it tries to access the server on the new master node is unchanged.
3. The LDAP server crashes after processing the request but before replying. In this case, the data is modified but the client does not know the result of its operation. Since the data is replicated using mirrored disks, the modification is visible on the new master node's LDAP database. If the client retries the same operation again with the new server, the result of the operation may be unexpected from the client point of view.

It is therefore necessary to have well-defined semantics for the non-idempotent operations so that retrying a failed call can be accomplished. For the add operation, an entry will be added if it does not exist, but rather then returning an entry already exists error if it already exists, it will instead overwrite an existing entry with the new values specified and return a success message. Thus, the client is not notified unnecessarily when the add operation fails. For example, if the primary LDAP server crashes after processing the add operation but before replying, the operation will be retried. Since the entry has already been added, however, the add operation cannot add it again. Therefore it is best not to inform the client of an error as the add operation really didn't fail.

For the delete operation, an entry will be deleted if it exists, but rather then returning an entry does not exist error if it does not exist, it will simply return a success message. Thus, the client is not notified unnecessarily when the delete operation fails. For example, if the primary LDAP server crashes after processing the delete operation but before replying, the operation will be retried. Since the entry has already been deleted, however, it cannot be deleted again. Therefore it is best not to inform the client of an error as the delete operation really didn't fail.

For the rename operation, an entry will be renamed if the new name does not exist, but rather then returning a no such object error if the entry with the old name does not exist, it will simply return a success message. Thus, the client is not notified unnecessarily when the rename operation fails. For example, if the primary LDAP server crashes after processing the rename operation but before replying, the operation will be retried. Since the entry has already been rename, however, the old name will not exist. Therefore it is best not to inform the client of an error as the rename operation really didn't fail.

In order to prevent errors, in a specific embodiment of the present invention, API calls cannot be interrupted by signals. If a signal is received during an API call, the call runs to completion.

This unique API allows for recovery from a master node failover/switchover until the recovery succeeds or a timeout occurs. It also allows interactions to be completely hidden from the client. Retrying a failed LDAP call in case of a master node failover/switchover is also possible. Lastly, the API provides the concept of a shared connection to the LDAP server to optimize resources.

Figure 8:
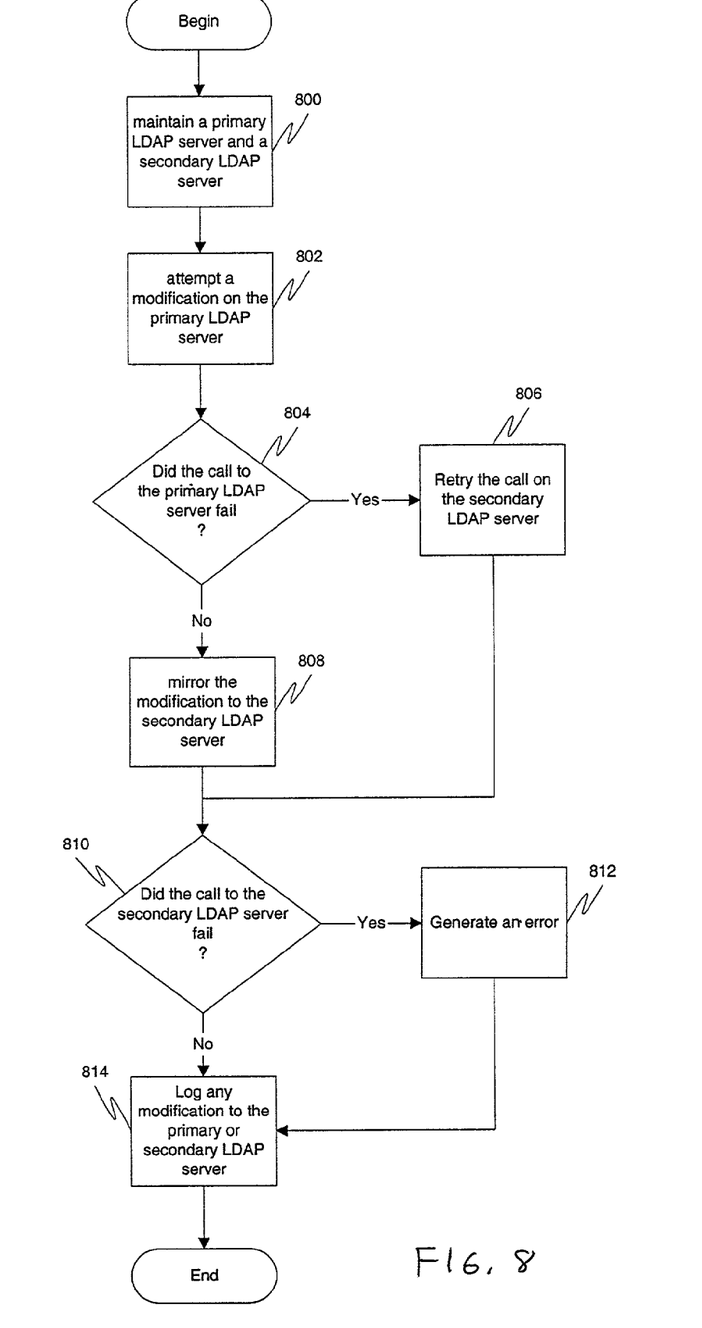
FIG. 8 is a flow diagram illustrating a method for managing lightweight directory access protocol (LDAP) service in accordance with a specific embodiment of the present invention.

FIG. 8 is a flow diagram illustrating a method for managing lightweight directory access protocol (LDAP) service in accordance with a specific embodiment of the present invention. At 800, a primary LDAP server and a secondary LDAP server are maintained. At 802, a modification is attempted on the primary LDAP server. At 804, it is determined if the call to a primary LDAP server failed. If it did, no error message is generated, but the process continues to 806, where the call is retried on the secondary LDAP server. Thus, it may include elements described in FIG. 4. If it did not fail, the modification is mirrored to the secondary LDAP server at 808. This mirroring may include remote mirroring, where any modification is sent to separate hosts on the primary LDAP server and the secondary LDAP server. At 810, it is determined if the call to the secondary LDAP server failed. If it did, an error is generated at 812. At 814, any modification to the primary LDAP server or the secondary LDAP server is logged. It may be logged in a journal or in a scoreboard. If not, the process is complete.

Figure 9:
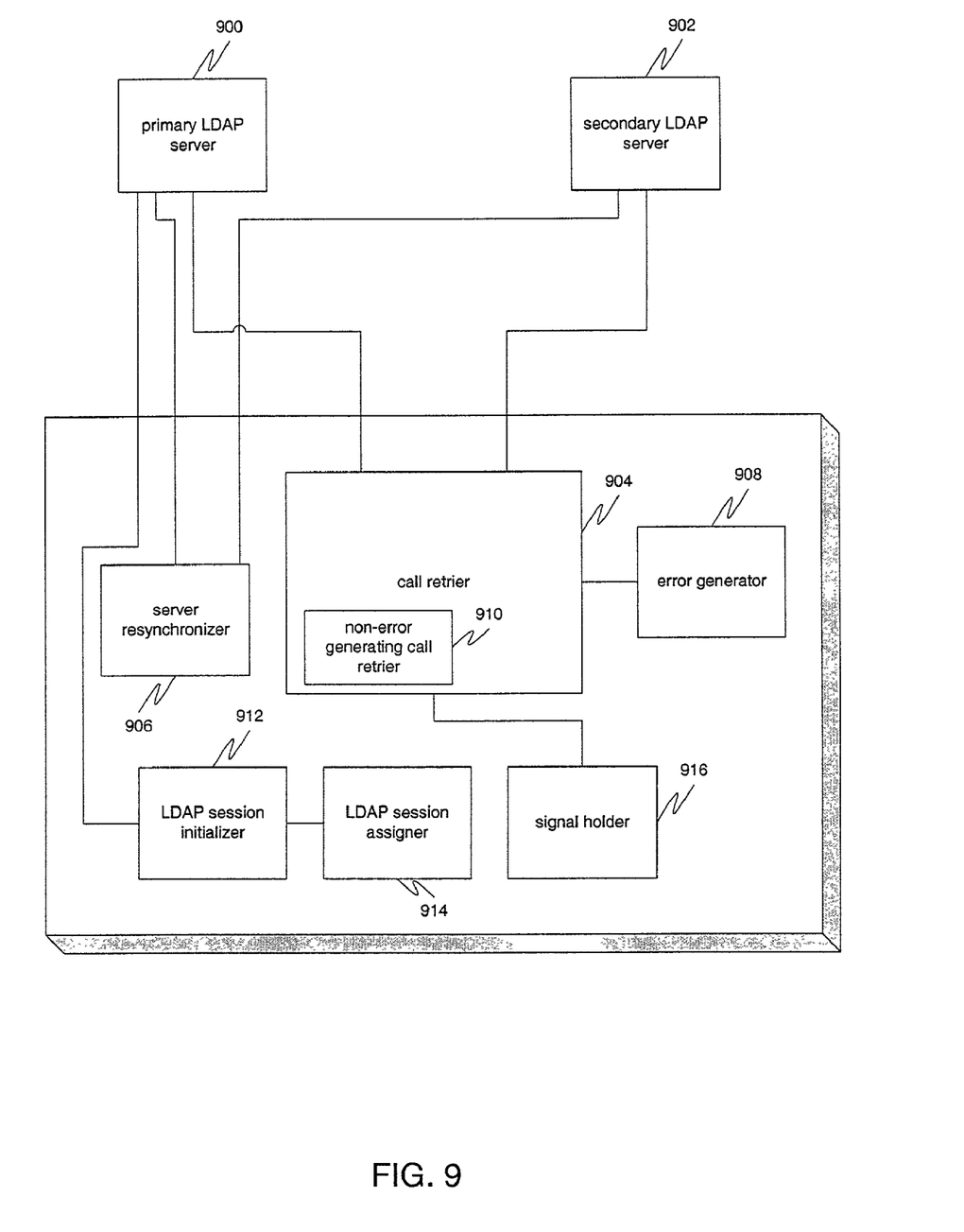
FIG. 9 is a block diagram illustrating an apparatus for managing lightweight directory access protocol (LDAP) service in accordance with a specific embodiment of the present invention.

FIG. 9 is a block diagram illustrating an apparatus for managing lightweight directory access protocol (LDAP) service in accordance with a specific embodiment of the present invention. A primary LDAP server having mirroring software 900 may be maintained. Additionally, a secondary LDAP server having mirroring software may also be maintained 902. The mirroring software may be remote mirroring software which includes a logging mechanism which logs all modification to the primary LDAP server or the secondary LDAP server. The logging mechanism may include a journal stored in a memory or a scoreboard store in a memory for storage of the logs. The mirroring software attempts to mirror any modifications to the primary LDAP server on the secondary LDAP server. A call retrier 904 coupled to the primary LDAP server 900 and to the secondary LDAP server 902 retries a call on the secondary LDAP server if it fails on the first LDAP server. A server resynchronizer 906 coupled to the primary LDAP server 900 and to the secondary LDAP server 902 may resynchronize the primary LDAP server 900 with the secondary LDAP server 902 once the primary LDAP server 900 comes back online. An error generator 908 coupled to the call retrier 904 may generate an error if the retried call to the secondary LDAP server 902 fails. It should be noted that the call retrier 904 includes a non-error generating call retrier 910 to ensure that no error is generated if the initial call to the primary LDAP server fails. An LDAP session initializer 912 coupled to the primary LDAP server 900 may initialize an LDAP session with the primary LDAP server 900. An LDAP session assigner 914 coupled to the LDAP session initializer 912 assigns a handle to the LDAP session. A signal holder 916 coupled to the call retrier 904 may hold a signal received during a call to allow the call to run to completion before the signal is handled.

Figure 10:
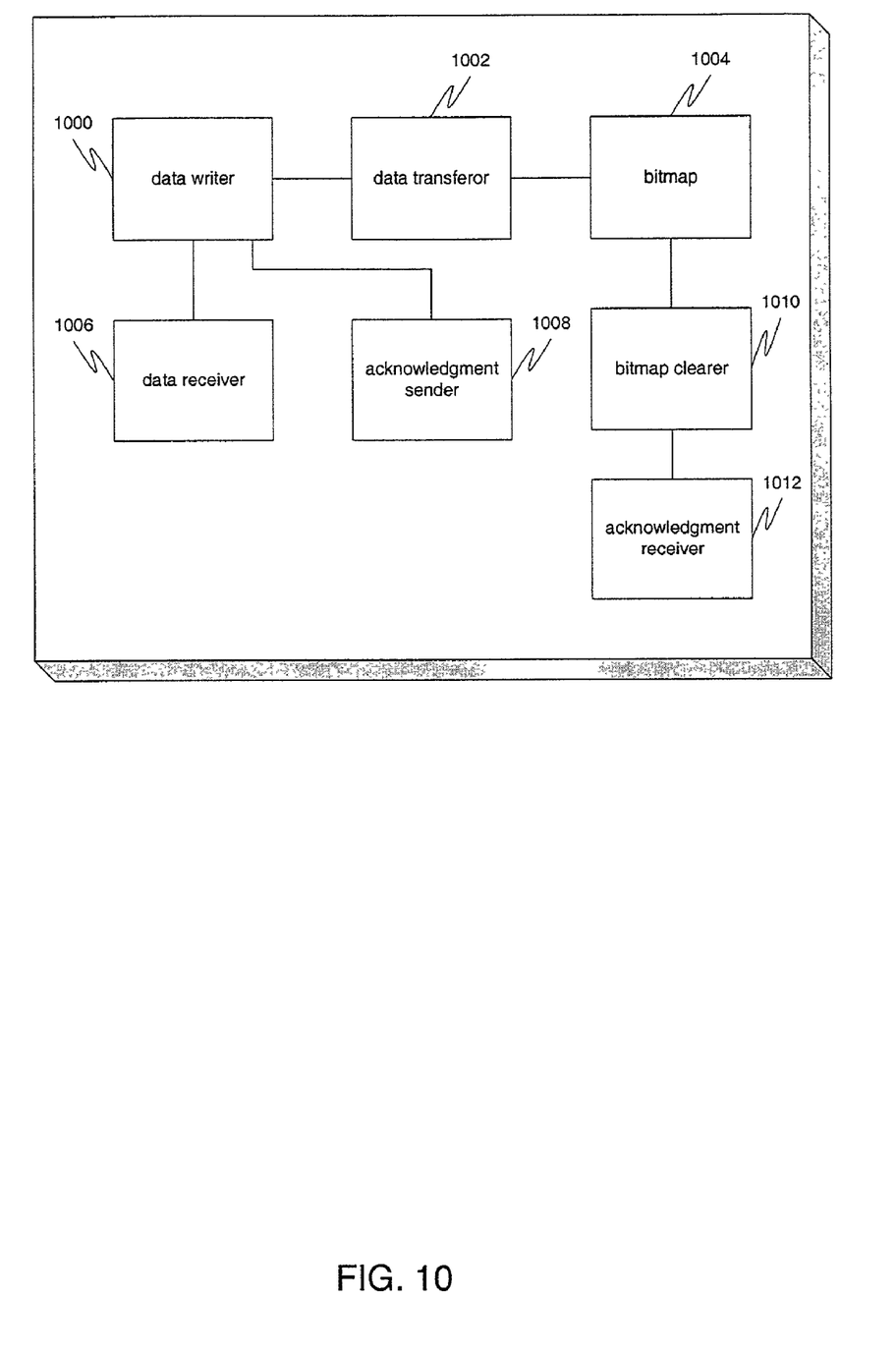
FIG. 10 is a block diagram illustrating mirroring software in accordance with a specific embodiment of the present invention.

FIG. 10 is a block diagram illustrating mirroring software in accordance with a specific embodiment of the present invention. A data writer 1000 may issue a write to the primary LDAP server. A data transferor 1002 coupled to the data writer 1000 and to a bitmap 1004 may transfer the write into a mirroring software layer where a bit is set in the bitmap 1004 for data that is being requested to be written. A data receiver 1006, used on the secondary LDAP server, coupled to the data writer 1000 may receive data transferred by a data transferor 1002 of mirroring software on the primary LDAP server and feed it to the data writer 1000 for writing to the secondary LDAP server. An acknowledgment sender 1008 coupled to the data writer 1000 may send an acknowledgement from the secondary LDAP server to the primary LDAP server. An acknowledgment receiver 1010 may receive this acknowledgment on the primary LDAP server and a bitmap clearer 1012 coupled to the acknowledgment receiver 1010 and to the bitmap 1004 may clear the bit in the bitmap.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method implemented by a secondary server to maintain a secondary directory, comprising:
  receiving notification from a primary server that a particular non-idempotent operation has been performed by the primary server on a primary directory;
  in response to the notification, performing the particular non-idempotent operation on the secondary directory such that the secondary directory mirrors the primary directory;
  receiving a request, from a client, to perform the particular non-idempotent operation on the secondary directory, wherein the client sends the request because the client has not received confirmation that the primary server has performed the particular non-idempotent operation on the primary directory;
  recognizing that the particular non-idempotent operation, identified in the request, cannot be performed on the secondary directory because the particular non-idempotent operation has already been performed on the secondary directory as a result of receiving the notification from the primary server; and
  in response to the recognition that the particular non-idempotent operation has already been performed on the secondary directory, the secondary server sending an indication to the client that the particular non-idempotent operation was successfully performed on the secondary directory even though the non-idempotent operation was not performed on the secondary directory after receiving the request.

2. The method of claim 1, wherein said particular non-idempotent operation is an add operation.

3. The method of claim 1, wherein said particular non-idempotent operation is a delete operation.

4. The method of claim 1, wherein said particular non-idempotent operation is a rename operation.

5. A machine-readable medium carrying one or more sequences of instructions for maintaining a secondary directory, wherein execution of the one or more sequences of instructions by one or more processors of a secondary server causes the one or more processors to perform the steps of:
  receiving notification from a primary server that a particular non-idempotent operation has been performed by the primary server on a primary directory;
  in response to the notification, performing the particular non-idempotent operation on the secondary directory such that the secondary directory mirrors the primary directory;
  receiving a request, from a client, to perform the particular non-idempotent operation on the secondary directory, wherein the client sends the request because the client has not received confirmation that the primary server has performed the particular non-idempotent operation on the primary directory;

recognizing that the particular non-idempotent operation, identified in the request, cannot be performed on the secondary directory because the particular non-idempotent operation has already been performed on the secondary directory as a result of receiving the notification from the primary server; and in response to the recognition that the particular non-idempotent operation has already been performed on the secondary directory, the secondary server sending an indication to the client that the particular non-idempotent operation was successfully performed on the secondary directory even though the non-idempotent operation was not performed on the secondary directory after receiving the request.

6. The machine-readable medium of claim 5, wherein said particular non-idempotent operation is an add operation.

7. The machine-readable medium of claim 5, wherein said particular non-idempotent operation is a delete operation.

8. The machine-readable medium of claim 5, wherein said particular non-idempotent operation is a rename operation.

9. An apparatus for maintaining a secondary directory, comprising:

means for receiving notification from a primary server that a particular non-idempotent operation has been performed by the primary server on a primary directory;

means for performing the particular non-idempotent operation on a secondary directory such that the secondary directory mirrors the primary directory in response to receiving the notification;

means for receiving a request, from a client, to perform the particular non-idempotent operation on the secondary directory, wherein the client sends the request because the client has not received confirmation that the primary server has performed the particular non-idempotent operation on the primary directory;

means for recognizing that the particular non-idempotent operation, identified in the request, cannot be performed on the secondary directory because the particular non-idempotent operation has already been performed on the secondary directory as a result of receiving the notification from the primary server; and means for sending, from the secondary server, an indication to the client that the particular non-idempotent operation was successfully performed on the secondary directory in response to the recognition that the particular non-idempotent operation has already been performed on the secondary directory even though the non-idempotent operation was not performed on the secondary directory after receiving the request.

10. The apparatus of claim 9, wherein said particular non-idempotent operation is an add operation.

11. The apparatus of claim 9, wherein said particular non-idempotent operation is a delete operation.

12. The apparatus of claim 9, wherein said particular non-idempotent operation is a rename operation.

13. The method of claim 1, wherein said primary directory and said secondary directory are both LDAP directories.

14. The machine-readable medium of claim 5, wherein said primary directory and said secondary directory are both LDAP directories.

15. The apparatus of claim 9, wherein said primary directory and said secondary directory are both LDAP directories.

\* \* \* \* \*